US012754200B2

(12) United States Patent
Best

(10) Patent No.: US 12,754,200 B2
(45) Date of Patent: Oct. 6, 2026

(54) MAGNET-BASED DETECTION SYSTEM FOR DETECTING A MOVEMENT OF A MOVABLE OBJECT

(71) Applicant: FRABA B.V., Heerlen (NL)

(72) Inventor: Tobias Best, Singapore (SG)

(73) Assignee: FRABA B.V., Sg Heerlen (NL)

( * ) Notice: Subject to any disclaimer, the term of this patent is extended or adjusted under 35 U.S.C. 154(b) by 247 days.

(21) Appl. No.: 18/714,096

(22) PCT Filed: Dec. 3, 2021

(86) PCT No.: PCT/EP2021/084157

§ 371 (c)(1),
(2) Date: May 29, 2024

(87) PCT Pub. No.: WO2023/099008

PCT Pub. Date: Jun. 8, 2023

(65) Prior Publication Data

US 2025/0020685 A1 Jan. 16, 2025

(51) Int. Cl.
*G01P 3/481* (2006.01)
*G01D 5/14* (2006.01)
(Continued)

(52) U.S. Cl.
CPC ............ *G01P 3/4815* (2013.01); *G01D 5/145* (2013.01); *G01P 3/50* (2013.01)

(58) Field of Classification Search
CPC .. G01P 3/4815; G01P 3/50; G01P 3/52; G01P 3/54; G01P 13/00; G01D 5/145; G01D 5/2013
See application file for complete search history.

(56) References Cited

U.S. PATENT DOCUMENTS 4,639,670 A * 1/1987 Normann ............... G01R 33/02 310/152
7,598,733 B2 * 10/2009 Mehnert ................. G01P 13/04 324/207.2
(Continued)

FOREIGN PATENT DOCUMENTS

DE 199 25 884 C2 12/2000
EP 0724712 B1 * 7/1999 ........... G01D 5/2451
(Continued)

*Primary Examiner* — Herbert K Roberts
(74) *Attorney, Agent, or Firm* — Norman B. Thot

(57) ABSTRACT

A magnet-based detection system includes an excitation unit having a magnet generating a magnetic field, and a sensor unit having a power Wiegand module, a sensor Wiegand module, an energy storage arrangement, and an evaluation unit. The power Wiegand module includes a power Wiegand coil, and a power Wiegand wire arrangement which generates a power output signal via the magnetic field. The sensor Wiegand module includes a sensor Wiegand coil, and a sensor Wiegand wire arrangement which generates a sensor output signal via the magnetic field. The sensor and the power Wiegand wire arrangements are different, and/or the sensor and the power Wiegand coils are different. The energy storage arrangement stores electrical energy. The evaluation unit evaluates the sensor output signal. The excitation unit or the sensor unit is connected with a movable object to co-move therewith, with the excitation unit or the sensor unit not so connected being immovable.

6 Claims, 3 Drawing Sheets

(51) Int. Cl.

| | |
|---|---|
| ***G01D 5/20*** | (2006.01) |
| ***G01P 3/50*** | (2006.01) |
| ***G01P 13/00*** | (2006.01) |

(56) References Cited

U.S. PATENT DOCUMENTS

| | | | | |
|---|---|---|---|---|
| 2014/0062366 | A1 | 3/2014 | Yoshidomi et al. | |
| 2015/0130450 | A1* | 5/2015 | Gehringer | G01D 5/3473 324/207.25 |
| 2015/0338245 | A1 | 11/2015 | Tatei et al. | |
| 2017/0322050 | A1* | 11/2017 | Mehnert | G01D 5/145 |
| 2018/0128662 | A1 | 5/2018 | Mehnert et al. | |
| 2021/0109122 | A1* | 4/2021 | Mitsuhashi | G01D 5/2458 |
| 2021/0131586 | A1* | 5/2021 | Larsen | F16K 37/0033 |
| 2021/0302148 | A1* | 9/2021 | Loeken | G01D 5/145 |
| 2021/0302201 | A1 | 9/2021 | Hallermann et al. | |
| 2022/0107336 | A1 | 4/2022 | Loeken | |

FOREIGN PATENT DOCUMENTS

| | | | | |
|---|---|---|---|---|
| JP | 2020-190430 | A | 11/2020 | |
| JP | 2021-528667 | A | 10/2021 | |
| WO | WO-2018224081 | A1 * | 12/2018 | G01D 5/145 |
| WO | WO 2020/160766 | A1 | 8/2020 | |

* cited by examiner

MAGNET-BASED DETECTION SYSTEM FOR DETECTING A MOVEMENT OF A MOVABLE OBJECT

CROSS REFERENCE TO PRIOR APPLICATIONS

This application is a U.S. National Phase application under 35 U.S.C. § 371 of International Application No. PCT/EP2021/084157, filed on Dec. 3, 2021. The International Application was published in English on Jun. 8, 2023 as WO 2023/099008 A1 under PCT Article 21(2).

FIELD

The present invention is directed to a magnet-based detection system for detecting a movement of a movable object, the magnet-based detection system comprising: an excitation unit with at least one excitation magnet for generating an excitation magnetic field, and a sensor unit with a sensor Wiegand module comprising a sensor Wiegand coil and a sensor Wiegand wire arrangement arranged at least partially within the sensor Wiegand coil, wherein the sensor Wiegand wire arrangement is configured to generate an output signal in the sensor Wiegand coil if excited by the excitation magnetic field, and an evaluation unit configured to evaluate the output signal of the sensor Wiegand module so as to determine at least one movement parameter, wherein either the excitation unit or the sensor unit is configured to be connected with the movable object so as to co-move therewith and the other is configured to be arranged immovably, so that the excitation magnetic field generated at the position of the sensor Wiegand module varies with the movement of the movable object.

BACKGROUND

Such detection systems can be referred to as a linear encoder, as a displacement encoder, as a displacement measuring/detection system, as a rotary encoder, as a rotary angle measuring/detection system, or as a rotary angle sensor. The movement of the object to be detected can generally be any kind of movement, but is typically a linear movement or a rotary movement.

Wiegand modules with a Wiegand coil and a Wiegand wire arrangement arranged at least partially within the Wiegand coil are well known in the art. The Wiegand wire arrangement comprises at least one Wiegand wire, i.e., a magnetically bistable wire which generally has a hard magnetic shell and a soft magnetic core or vice versa. Wiegand wires or Wiegand modules in the sense of the present invention can also be referred to as pulse wires or pulse wire modules, respectively. Under the influence of an external magnetic field, for example, the excitation magnetic field generated by the excitation unit, a magnetization direction of the at least one Wiegand wire and thus of the entire Wiegand wire arrangement changes relatively abruptly, thereby causing a relatively short voltage pulse in the Wiegand coil which radially surrounds the Wiegand wire arrangement. This effect is referred to as the Wiegand effect and is well known in the art. The voltage pulse(s) generated in the Wiegand coil are hereinafter referred to as the output signal of the Wiegand module.

It is generally known in the art that the number/frequency of the voltage pulses of the output signal can be used to determine a movement distance and/or a movement speed of a movable object. It is also known in the art that the electrical energy of the voltage pulses of the output signal can be stored in an energy storage arrangement and used for powering an evaluation unit so that the detection system can be operated to be completely energy self-sufficient.

The electrical energy provided by the output signal of a conventional Wiegand module with a single Wiegand wire is, however, relatively low, which strongly limits the number and complexity of components that can be powered by the electrical energy provided by the output signal of the Wiegand module. This limits the range of applications for such a detection system.

Against this background, DE 199 25 884 C2 and WO 2020/160766 A1 describe Wiegand modules which are provided with a Wiegand wire arrangement having more than one Wiegand wire. Due to the larger number of Wiegand wires, the output signal of the disclosed Wiegand modules typically provides more electrical energy compared to that of a Wiegand module with a single Wiegand wire. However, the Wiegand wires generally do not change their magnetization direction simultaneously, but one after the other with slight delays. This causes the voltage pulse generated in the Wiegand coil to be relatively broad or to even be split into multiple voltage pulses, which makes it very difficult or even impossible to reliably determine the movement parameter based on the output signal.

SUMMARY

An aspect of the present invention is to provide a reliable and versatile magnet-based detection system for detecting a movement of a movable object.

In an embodiment, the present invention provides a magnet-based detection system for detecting a movement of a movable object. The magnet-based detection system includes an excitation unit comprising at least one excitation magnet, and a sensor unit. The excitation unit is configured to generate an excitation magnetic field. The sensor unit comprises a power Wiegand module, a sensor Wiegand module, an energy storage arrangement, and an evaluation unit. The power Wiegand module comprises a power Wiegand coil, and a power Wiegand wire arrangement which is arranged at least partially within the power Wiegand coil. The power Wiegand wire arrangement is configured to generate a power output signal in the power Wiegand coil when the power Wiegand wire arrangement is excited by the excitation magnetic field. The sensor Wiegand module comprises a sensor Wiegand coil, and a sensor Wiegand wire arrangement which is arranged at least partially within the sensor Wiegand coil. The sensor Wiegand wire arrangement is configured to generate a sensor output signal in the sensor Wiegand coil when the sensor Wiegand wire arrangement is excited by the excitation magnetic field. The sensor Wiegand wire arrangement is different from the power Wiegand wire arrangement, and/or the sensor Wiegand coil is different from the power Wiegand coil. The energy storage arrangement is configured to store an electrical energy provided by the power output signal of the power Wiegand module. The evaluation unit is configured to evaluate the sensor output signal of the sensor Wiegand module so as to determine at least one movement parameter. Either the excitation unit or the sensor unit is configured to be connected with the movable object so as to co-move therewith, and the excitation unit or the sensor unit which is not configured to be connected with the movable object is configured to be immovable.

BRIEF DESCRIPTION OF THE DRAWINGS

The present invention is described in greater detail below on the basis of embodiments and of the drawings in which.

DETAILED DESCRIPTION

Figure 1:
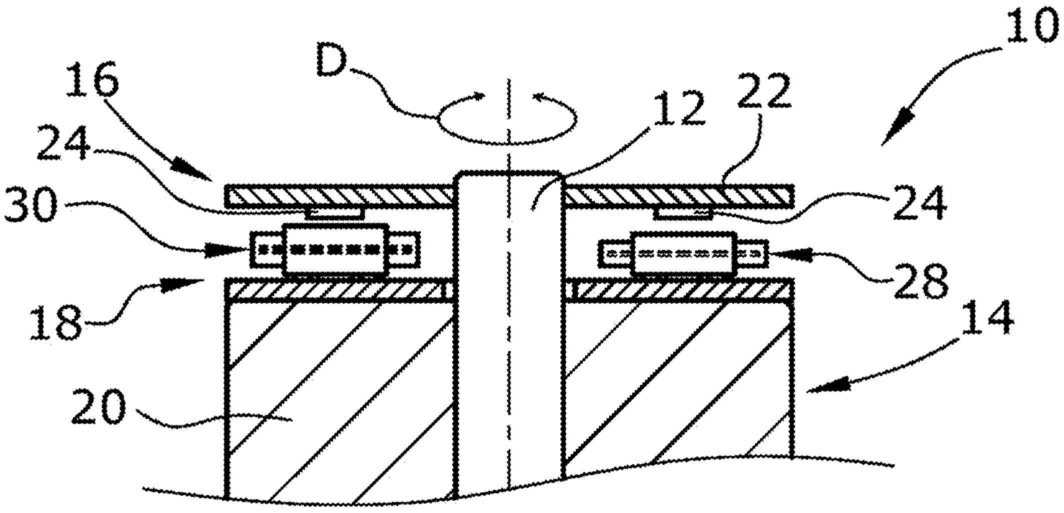
FIG. 1 shows a schematic illustration of a first embodiment of a magnet-based detection system for detecting a movement of a movable object according to the present invention.
Figure 2:
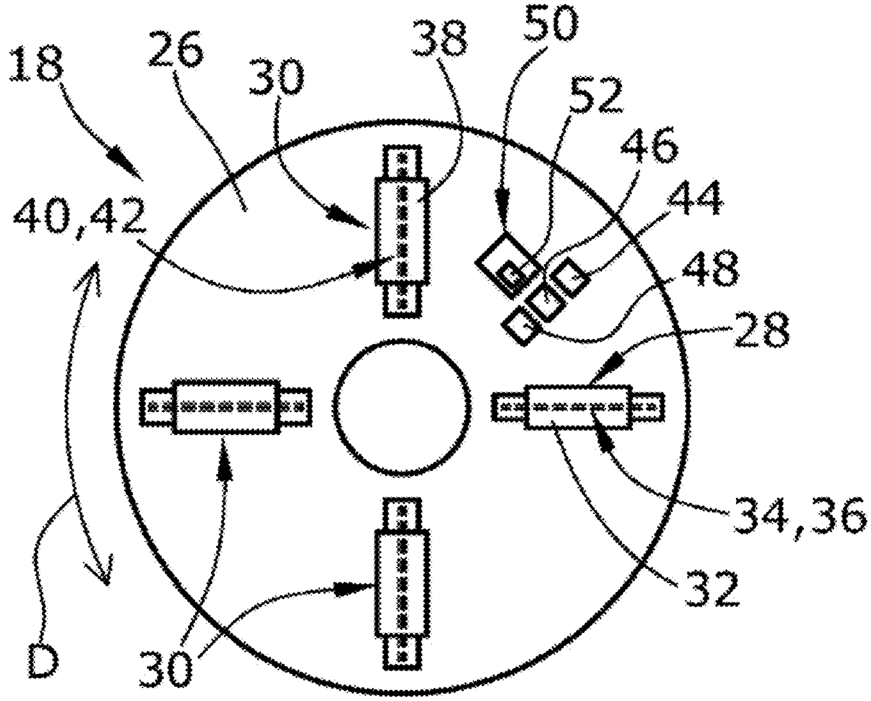
FIG. 2 shows a schematic illustration of a sensor unit of the magnet-based detection system of FIG. 1.
Figure 3:
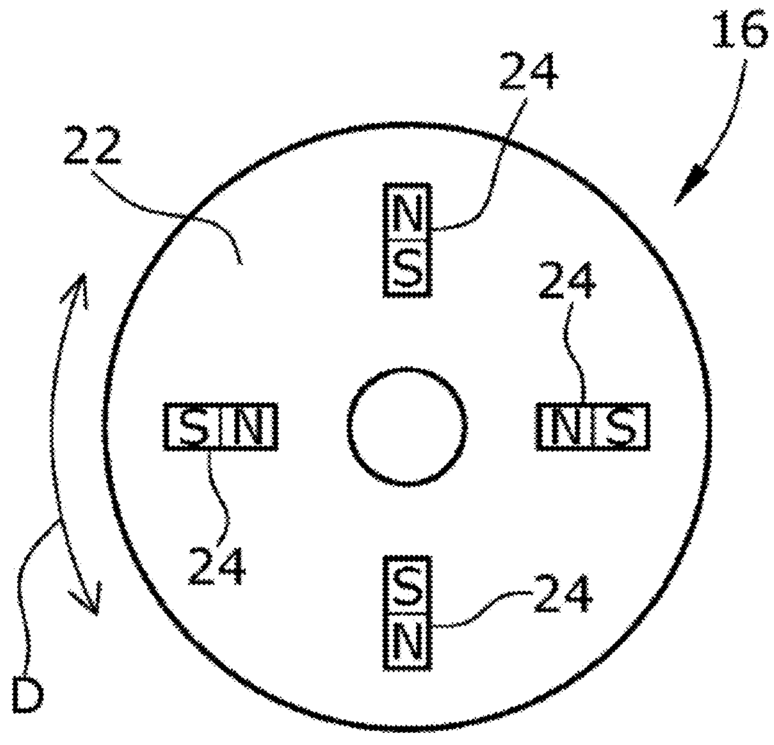
FIG. 3 shows a schematic illustration of an excitation unit of the magnet-based detection system of FIG. 1.
Figure 4:
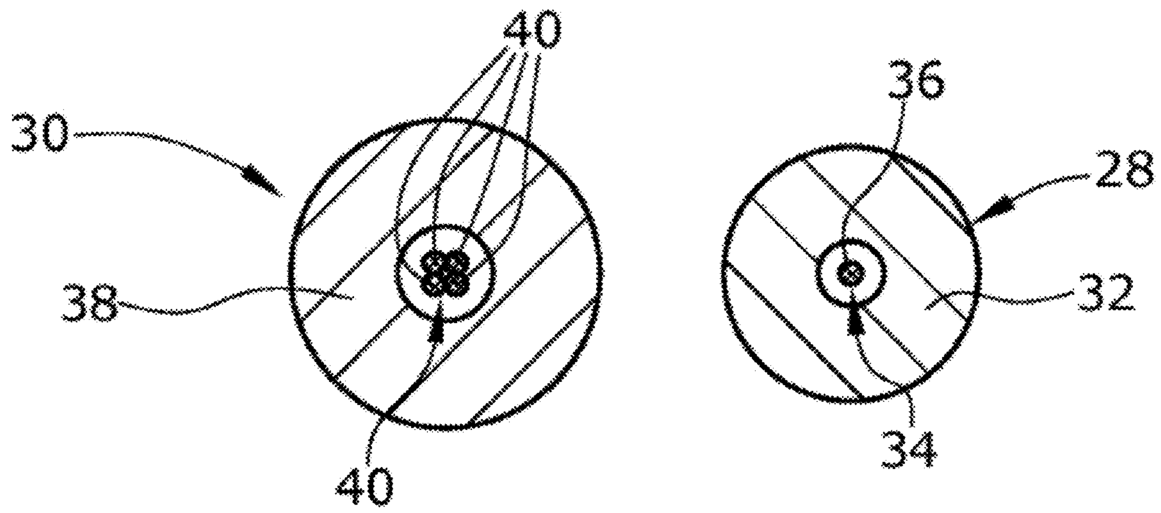
FIG. 4 shows schematic cross sections of a power Wiegand module and a sensor Wiegand module of the sensor unit of FIG. 2.

The magnet-based detection system according to the present invention is provided with an excitation unit which comprises at least one excitation magnet for generating an excitation magnetic field, and with a separate sensor unit for detecting the excitation magnetic field. Either the excitation unit or the sensor unit is configured to be connected with the movable object, the movement of which is to be detected, so as to co-move therewith; the respective other one of the excitation unit or the sensor unit is configured to be arranged immovably. The excitation magnetic field generated by the excitation unit at a defined position of the sensor unit thereby varies with the movement of the movable object which allows the sensor unit to determine at least one movement parameter based on the detected excitation magnetic field. The excitation unit and the sensor unit are in particular designed so that an alternating excitation magnetic field is generated at a defined position of the sensor unit if the movable object is moved.

The sensor unit according to the present invention is provided with two separate Wiegand modules, a power Wiegand module and a sensor Wiegand module. The power Wiegand module comprises a power Wiegand coil and a power Wiegand wire arrangement which has at least one power Wiegand wire and which is arranged at least partially within the power Wiegand coil. The power Wiegand wire arrangement is configured to generate a power output signal in the power Wiegand coil if the power Wiegand wire arrangement is excited by the excitation magnetic field. The sensor Wiegand module comprises a sensor Wiegand coil and a sensor Wiegand wire arrangement which has at least one sensor Wiegand wire and which is arranged at least partially within the sensor Wiegand coil. The sensor Wiegand wire arrangement is configured to generate a sensor output signal in the sensor Wiegand coil if the sensor Wiegand wire arrangement is excited by the excitation magnetic field.

The magnet-based detection system according to the present invention is also provided with an evaluation unit for determining at least one movement parameter. The evaluation unit according to the present invention is supplied with electrical energy supplied by the power output signal of the power Wiegand module. The evaluation unit is configured to evaluate the sensor output signal of the sensor Wiegand module to determine the at least one movement parameter.

The magnet-based detection system according to the present invention is also provided with an energy storage arrangement which is configured to store electrical energy provided by the power output signal of the power Wiegand module. The energy storage arrangement comprises at least one energy storage device which can be a simple capacitor or any other device which provides for the storage of electrical energy. The electrical energy stored in the energy storage arrangement is used to power the evaluation unit and/or other components of the sensor unit.

The present invention provides that the sensor Wiegand module, the output signal of which is evaluated by the evaluation unit, and the power Wiegand module, from which electrical energy of the output signal is stored in the energy storage arrangement for powering the evaluation unit and/or other components of the sensor unit, are designed differently. The sensor Wiegand wire arrangement is in particular different from the power Wiegand wire arrangement and/or the sensor Wiegand coil is in particular different from the power Wiegand coil. The sensor Wiegand wire arrangement and the power Wiegand wire arrangement can, for example, be provided with a different number of Wiegand wires or with Wiegand wires having different wire diameters. The sensor Wiegand coil and the power Wiegand coil can, for example, be provided with a different number of windings or with different coil diameters.

Using two separate Wiegand modules for providing electrical energy and for providing the sensor output signal for determining the movement parameter allows each Wiegand module to be individually optimized for its respective application. The power Wiegand module according to the present invention can in particular be optimized for generating a power output signal which provides a particularly high electrical energy, and the sensor Wiegand module according to the present invention can in particular be optimized for generating a sensor output signal which allows the movement parameter to be determined reliably and accurately. The high electrical energy provided by the power Wiegand module allows, for example, for the operation of a relatively complex evaluation unit, of additional sensor elements and/or of a wireless data interface.

The sensor unit with the two different Wiegand modules according to the present invention therefore allows a reliable and versatile magnet-based detection system to be provided for detecting a movement of a movable object.

The sensor unit can, for example, be provided with more than one power Wiegand module, each power Wiegand module comprising a power Wiegand coil and a power Wiegand wire arrangement arranged at least partially within the power Wiegand coil, wherein the power Wiegand wire arrangement is configured to generate a power output signal in the power Wiegand coil if excited by the excitation magnetic field. Each power Wiegand module is designed differently from the sensor Wiegand module. For each power Wiegand module, the power Wiegand wire arrangement is in particular different from the sensor Wiegand wire arrangement and/or the power Wiegand coil is in particular different from the sensor Wiegand coil. All power Wiegand modules can generally be designed differently. All power Wiegand modules can, for example, be substantially identical, which allows the power Wiegand sensor to be manufactured more efficiently. The energy storage arrangement is configured to store electrical energy provided by the power output signals of all power Wiegand modules so that the total energy of the power output signals of all power Wiegand modules can be used to power the evaluation unit and/or other components of the sensor unit. Using more than one power Wiegand module allows for a significant increase in the amount of electrical energy generated by the sensor unit, which in turn allows more or complex components to be powered. This allows a particularly reliable and versatile magnet-based detection system for detecting a movement of a movable object to be realized.

The power Wiegand modules can, for example, be arranged displaced from each other with respect to a movement direction of the movable object, for example, displaced with respect to a circumferential direction in case of a rotatable object or with respect to a linear direction in case of a linearly movable object. The power Wiegand modules can, for example, be equidistantly distributed along a movement distance of the movable object, for example, equidistantly distributed along a circumference of a rotatable object or equidistantly distributed along a linear movement distance of a linearly movable object. This allows a relatively efficient and relatively continuous supply of electrical energy to be realized by the power Wiegand modules during the movement of the movable object.

For each power Wiegand module, a total power Wiegand wire volume of the power Wiegand wire arrangement, i.e., the total volume of all power Wiegand wires of the respective power Wiegand wire arrangement, can, for example, be larger than a total sensor Wiegand wire volume of the sensor Wiegand wire arrangement of the sensor Wiegand module, i.e., the total volume of all sensor Wiegand wires of the sensor Wiegand wire arrangement. The power Wiegand wire arrangement can, for example, be provided with a larger number of power Wiegand wires compared to the number of sensor Wiegand wires of the sensor Wiegand wire arrangement, and/or with a power Wiegand wire having a larger diameter compared to that of the sensor Wiegand wire. The power Wiegand wire module can generate more electrical energy compared to the sensor Wiegand wire module due to the relatively large total power Wiegand wire volume of the power Wiegand wire arrangement. Due to the relatively small total sensor Wiegand wire volume of the sensor Wiegand wire arrangement, the sensor Wiegand wire module can on the other hand provide a sensor output signal with relatively sharp voltage pulses which can be reliably evaluated by the evaluation unit. This allows a particularly reliable and versatile magnet-based detection system for detecting a movement of a movable object to be realized.

For each power Wiegand module, a power Wiegand coil inductance of the power Wiegand coil can, for example, be higher than a sensor Wiegand coil inductance of the sensor Wiegand coil of the sensor Wiegand module. The power Wiegand coil can, for example, be provided with a larger number of windings or with a larger coil diameter compared to those of the sensor Wiegand coil. Due to the relatively high power Wiegand coil inductance of the power Wiegand coil, the power Wiegand wire module can generate more electrical energy compared to the sensor Wiegand wire module. Due to the relatively low Wiegand coil inductance of the sensor Wiegand coil, the sensor Wiegand wire module can on the other hand provide a sensor output signal which can be reliably evaluated by the evaluation unit. This allows a particularly reliable and versatile magnet-based detection system for detecting a movement of a movable object to be realized.

The evaluation unit can, for example, be electrically connected with the energy storage device arrangement so as to be supplied with electrical energy stored therein. This allows power to be provided to a relatively complex evaluation unit without the need of an external energy supply, and thus allows a particularly reliable and versatile magnet-based detection system for detecting a movement of a movable object to be realized.

The sensor unit can, for example, be provided with a wireless data interface for wireless data transmission, wherein the wireless data interface is electrically connected with the energy storage arrangement so as to be supplied with electrical energy stored therein. The wireless data interface allows data, for example, movement parameters and/or configuration data, to be transmitted to/from the sensor unit completely wirelessly. Since the wireless data interface is supplied with electrical energy which has been provided by the power output signal of at least one power Wiegand module and has been stored in the energy storage arrangement, no external energy supply is required for operating the wireless data interface. The sensor unit can thus be installed without requiring any cable connection. This allows a particularly versatile magnet-based detection system for detecting a movement of a movable object to be realized.

The sensor unit can, for example, be provided with an additional sensor element for sensing a physical property, wherein the additional sensor element is electrically connected with the energy storage arrangement so as to be supplied with electrical energy stored therein. The additional sensor element can, for example, be a temperature sensor or a pressure sensor. The additional sensor element allows for the detection of an additional physical property of the movable object or of the environment of the movable object. The detected additional physical property can, for example, be used to allow for a more accurate determination of the at least one movement parameter by the evaluation unit. Since the additional sensor element is supplied with electrical energy which has been provided by the power output signal of at least one power Wiegand module and has been stored in the energy storage arrangement, no external energy supply is required for operating the additional sensor element. This allows a particularly reliable magnet-based detection system for detecting a movement of a movable object to be realized.

Two embodiments of the present invention are described below with reference to the enclosed drawings.

FIG. 1 shows a magnet-based detection system 10 which is configured to detect a movement of a movable object 12 along a movement direction D. The movable object 12 is here a rotatable shaft of an electric motor 14, and the movement direction D is the circumferential direction of the shaft.

The magnet-based detection system 10 comprises an excitation unit 16 which is attached to the movable object 12 so as to co-move therewith, and a sensor unit 18 which is attached to an immovable housing part 20 of the electric motor 14.

The excitation unit 16 comprises a disc shaped support element 22 which radially surrounds the moveable object 12 and is attached thereto. The excitation unit 16 comprises four permanent-magnetic excitation magnets 24 which are arranged on a surface of the support element 22 facing the sensor unit 18. The four excitation magnets 24 are arranged to be equidistantly distributed over the circumference of the support element 22, i.e., are equidistantly displaced from each other with respect to the movement direction D of the movable object 12. The four excitation magnets 24 are configured so that adjacent excitation magnets 24 have substantially opposite radial magnetization, i.e., have different magnetic polarities (N: magnetic north pole, S: magnetic south pole) at their radially inner side and radially outer side, respectively. The excitation magnets 24 thus generate an excitation magnetic field which varies with respect to a defined position of the sensor unit 18 as the movable object 12 moves in the movement direction D.

The sensor unit 18 comprises a disc shaped circuit board 26 which radially surrounds the moveable object 12 and which is attached to the housing part 20. The sensor unit 18 comprises one sensor Wiegand module 28 and three power Wiegand modules 30 which are arranged on a surface of the circuit board 26 facing the excitation unit 16. The four Wiegand modules 28, 30 are arranged to be equidistantly distributed over the circumference of the circuit board 26, i.e., are equidistantly displaced from each other with respect to the movement direction D of the movable object 12.

The sensor Wiegand module 28 comprises a sensor Wiegand coil 32 and a sensor Wiegand wire arrangement 34 with one single sensor Wiegand wire 36. The sensor Wiegand wire arrangement 34 is arranged partially within the sensor Wiegand coil 32 so that the sensor Wiegand coil 32 radially surrounds an axial midsection of the sensor Wiegand wire 36. The sensor Wiegand wire arrangement 34 is thus configured to generate a sensor output signal in the sensor Wiegand coil 32 in response to being excited by the excitation magnetic field generated by the excitation magnets 24.

Each of the three power Wiegand modules 30 comprises a power Wiegand coil 38 and a power Wiegand wire arrangement 40 with four power Wiegand wires 42. The power Wiegand wire arrangement 40 is arranged partially within the power Wiegand coil 38 so that the power Wiegand coil 38 radially surrounds an axial midsection of each of the four power Wiegand wires 42. The power Wiegand wire arrangement 40 is thus configured to generate a power output signal in the power Wiegand coil 38 in response to being excited by the excitation magnetic field generated by the excitation magnets 24.

The number of power Wiegand wires 42 is larger than the number of sensor Wiegand wires 36 so that a total power Wiegand wire volume of the power Wiegand wire arrangement 40 is larger than a total sensor Wiegand wire volume of the sensor Wiegand wire arrangement 34. The power Wiegand coil 38 also has a coil diameter which is larger than a coil diameter of the sensor Wiegand coil 32 so that a power Wiegand coil inductance of the power Wiegand coil 38 is higher than a sensor Wiegand coil inductance of the sensor Wiegand coil 32.

The sensor unit 18 comprises an energy storage arrangement 44 which is electrically connected with each of the three power Wiegand modules 30 and which is configured to store electrical energy provided by the power output signals of the three power Wiegand modules 30.

The sensor unit 18 comprises a wireless data interface 46 which is electrically connected with the energy storage arrangement 44 so as to be supplied with electrical energy which has been provided by the power output signals of the three power Wiegand modules 30 and has been stored in the energy storage arrangement 44. The wireless data interface 46 is configured to allow wireless transmission, for example, the sending and receiving of data.

The sensor unit 18 comprises an additional sensor element 48 which is electrically connected with the energy storage arrangement 44 so as to be supplied with electrical energy which has been provided by the power output signals of the three power Wiegand modules 30 and has been stored in the energy storage arrangement 44. The additional sensor element 48 is configured to sense a physical property and to provide a respective sensor element output signal. The additional sensor element 48 can, for example, be a temperature sensor which is configured to sense a temperature and to provide a respective temperature signal.

The sensor unit 18 comprises an evaluation unit 50 which is electrically connected with the energy storage arrangement 44 so as to be supplied with electrical energy which has been provided by the power output signals of the three power Wiegand modules 30 and has been stored in the energy storage arrangement 44. The evaluation unit 50 is electrically connected with the sensor Wiegand module 28 so as to receive the sensor output signal which is generated in the sensor Wiegand coil 32 by the sensor Wiegand wire arrangement 34. The evaluation unit 50 is electrically connected with the additional sensor element 48 so as to receive the sensor element output signal which is provided by the additional sensor element 48. The evaluation unit 50 is electrically connected with the wireless data interface 46 so as to allow a transmission of data to/from the evaluation unit 50. The evaluation unit 50 comprises a data storage 52.

The evaluation unit 50 is configured to evaluate the sensor output signal of the sensor Wiegand module 28 and the sensor element output signal of the additional sensor element 48 so as to determine a physical property parameter, for example, a current temperature, and at least one movement parameter, for example, a current rotary angle of the movable object 12 and/or a rotation count value representing a total number of rotations of the movable object 12. The evaluation unit 50 is configured to store the determined physical property parameter and the determined at least one movement parameter in the data storage 52 and to allow for a transmission of the determined physical property parameter and the determined at least one movement parameter via the wireless data interface 46. The evaluation unit 50 can also be configured to store a history/progression of the physical property parameter.

Figure 5:
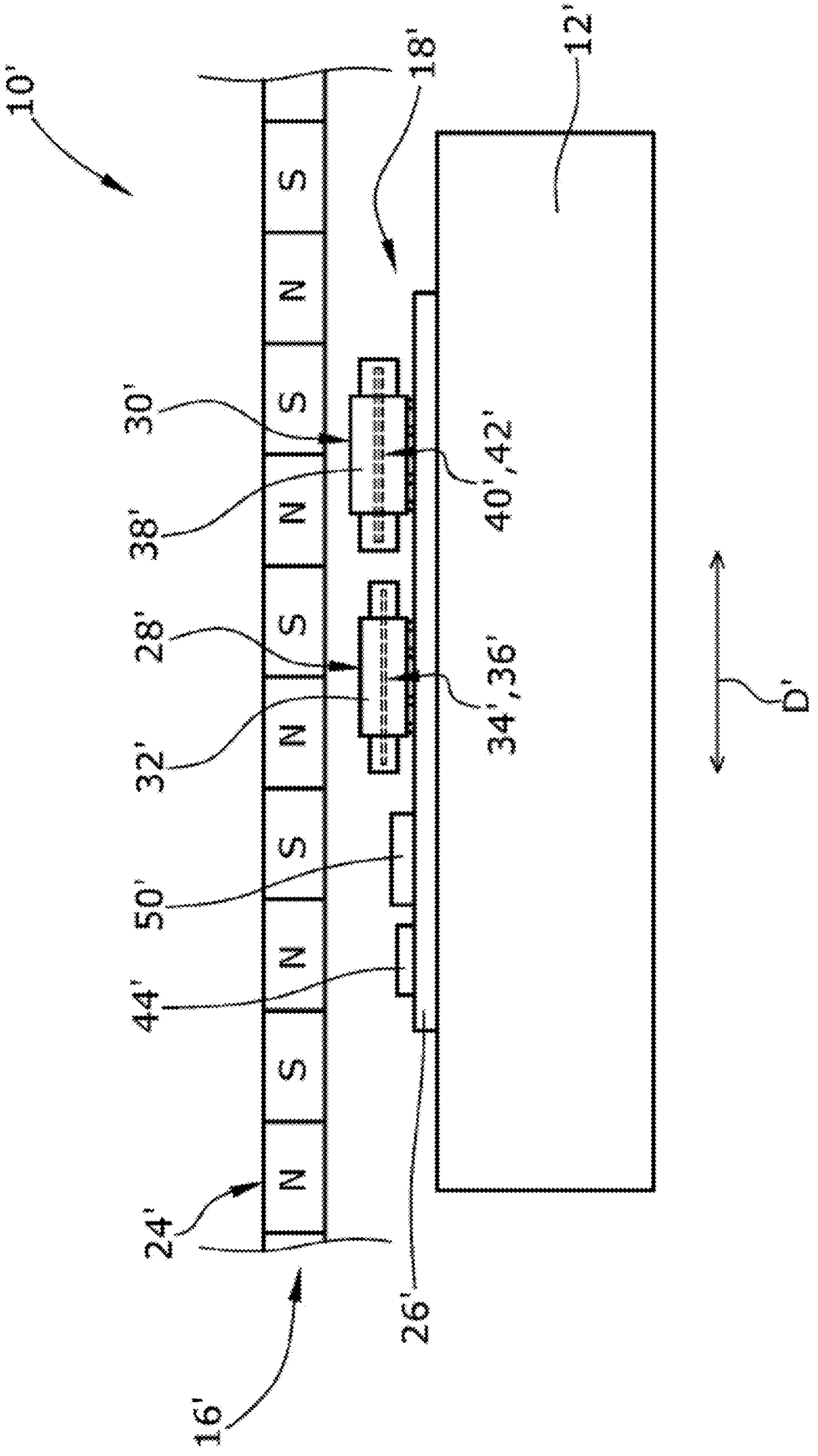
FIG. 5 shows a schematic illustration of a second embodiment of a magnet-based detection system for detecting a movement of a movable object according to the present invention.

FIG. 5 shows an alternative magnet-based detection system 10' according to the present invention. Features of the magnet-based detection system 10' which are already known from the magnet-based detection system 10 are referenced with the respective reference sign of FIGS. 1 to 4 but with an additional apostrophe character.

The magnet-based detection system 10' is configured to detect a movement of the movable object 12 which is linearly movable along the movement direction D'. The sensor unit 18' is here attached to the movable object 12' so as to co-move therewith, and the exaction unit 16' is arranged to be immovable.

The excitation unit 16' comprises a longitudinal excitation magnet 24' which is provided with an alternating sequence of magnetic north poles N and magnetic south poles S in the movement direction D'. The excitation magnet 24' can be a single permanently magnetized body or can comprise a plurality of permanent magnets which are arranged side by side. The excitation magnet 24' generates an excitation magnetic field which varies with respect to a defined position of the sensor unit 18' as the movable object 12' moves in the movement direction D'.

The structure and functionality of the sensor unit 18' are substantially identical to those of the sensor unit 18 of the magnet-based detection system 10, the main difference being that the sensor unit 18' comprises only one power Wiegand module 30' which is arranged adjacent to the sensor Wiegand module 28' in the movement direction D'. The sensor Wiegand module 28' and the power Wiegand module 30' themselves are again designed substantially identical to the sensor Wiegand module 28 and the power Wiegand module 30 of the sensor unit 18 of the magnet-based detection system 10.

The present invention is not limited to embodiments described herein; reference should be had to the appended claims.

LIST OF REFERENCE CHARACTERS

10; 10' magnet-based detection system
12; 12' movable object
14 electric motor
16; 16' excitation unit
18; 18' sensor unit
20 housing part
22 support element
24; 24' excitation magnets
26; 26' circuit board
28; 28' sensor Wiegand module
30; 30' power Wiegand modules
32; 32' sensor Wiegand coil
34; 34' sensor Wiegand wire arrangement
36; 36' sensor Wiegand wire
38; 38' power Wiegand coil
40; 40' power Wiegand wire arrangement
42; 42' power Wiegand wire
44; 44' energy storage arrangement
46 wireless data interface
48 additional sensor element
50; 50' evaluation unit
52 data storage
D; D' movement direction
N magnetic north pole
S magnetic south pole

The invention claimed is:

1. A magnet-based detection system for detecting a movement of a movable object, the magnet-based detection system comprising:

an excitation unit comprising at least one excitation magnet, the excitation unit being configured to generate an excitation magnetic field; and a sensor unit, wherein the sensor unit comprises:

a power Wiegand module comprising, a power Wiegand coil, and a power Wiegand wire arrangement which is arranged at least partially within the power Wiegand coil, the power Wiegand wire arrangement being configured to generate a power output signal in the power Wiegand coil when the power Wiegand wire arrangement is excited by the excitation magnetic field;

a sensor Wiegand module comprising, a sensor Wiegand coil, and a sensor Wiegand wire arrangement which is arranged at least partially within the sensor Wiegand coil, the sensor Wiegand wire arrangement being configured to generate a sensor output signal in the sensor Wiegand coil when the sensor Wiegand wire arrangement is excited by the excitation magnetic field, wherein, the sensor Wiegand wire arrangement is different from the power Wiegand wire arrangement, the difference comprising a different total Wiegand wire volume, and/or the sensor Wiegand coil is different from the power Wiegand coil, the difference comprising a different Wiegand coil inductance;

an energy storage arrangement which is configured to store an electrical energy provided by the power output signal of the power Wiegand module; and an evaluation unit which is configured to evaluate the sensor output signal of the sensor Wiegand module so as to determine at least one movement parameter, wherein, either the excitation unit or the sensor unit is configured to be connected with the movable object so as to co-move therewith within a reference frame of the magnet-based detection system, and the excitation unit or the sensor unit which is not configured to be connected with the movable object is configured to be fixed within the reference frame of the magnet-based detection system.

2. The magnet-based detection system as recited in claim 1, wherein, the sensor unit comprises a plurality of power Wiegand modules, each of the plurality of the power Wiegand modules comprises a power Wiegand coil and a power Wiegand wire arrangement which is arranged at least partially within the power Wiegand coil, the power Wiegand wire arrangement for each of the plurality of the power Wiegand modules is different from the sensor Wiegand wire arrangement and/or the power Wiegand coil for each of the plurality of the power Wiegand modules is different from the sensor Wiegand coil, the power Wiegand wire arrangement of each of the plurality of the power Wiegand modules is configured to generate a power output signal in the power Wiegand coil when the power Wiegand wire arrangement is excited by the excitation magnetic field, and the energy storage arrangement is configured to store an electrical energy provided by the power output signal of each of the plurality of power Wiegand modules.

3. The magnet-based detection system as recited in claim 2, wherein the plurality of power Wiegand modules are arranged displaced from each other with respect to a movement direction of the movable object.

4. The magnet-based detection system as recited in claim 1, wherein the evaluation unit is electrically connected with the energy storage arrangement so that the evaluation unit is supplied with the electrical energy stored in the energy storage arrangement.

5. The magnet-based detection system as recited in claim 1, wherein the sensor unit further comprises a wireless data interface for a wireless data transmission, the wireless data interface being electrically connected with the energy storage arrangement so that the wireless data interface is supplied with the electrical energy stored in the energy storage arrangement.

6. The magnet-based detection system as recited in claim 1, wherein the sensor unit further comprises an additional sensor element which is configured to sense a physical property, the additional sensor element being electrically connected with the energy storage arrangement so that the additional sensor element is supplied with the electrical energy which is stored in the energy storage arrangement.

* * * * *